United States Patent [19]

Allen

[11] 4,162,601

[45] Jul. 31, 1979

[54] SECONDARY CLOSURE, METHOD AND APPARATUS

[75] Inventor: David O. Allen, Wilmington, Ohio

[73] Assignee: Buckeye Molding Company, New Vienna, Ohio

[21] Appl. No.: 825,964

[22] Filed: Aug. 19, 1977

[51] Int. Cl.[2] .......................... B65B 7/28; B67B 5/00; B67B 3/22; B23P 11/02

[52] U.S. Cl. .......................................... 53/292; 53/556; 29/235; 29/450

[58] Field of Search ................. 53/292, 290, 320, 321, 53/329, 30 R, 331.5, 319; 29/235, 450; 141/374, 356

[56] References Cited

U.S. PATENT DOCUMENTS

| | | | |
|---|---|---|---|
| 878,241 | 2/1908 | Schneider | 141/356 X |
| 2,226,483 | 12/1940 | Seymour | 53/292 |
| 2,544,009 | 3/1951 | Détrez | 53/319 |
| 2,771,725 | 11/1956 | Carter | 53/292 X |
| 2,778,179 | 1/1957 | Miliez | 53/291 |
| 2,780,379 | 2/1957 | Ferguson | 215/256 X |
| 2,785,521 | 3/1957 | Demski | 53/331.5 |
| 2,890,558 | 6/1959 | Eddison et al. | 53/292 |
| 3,588,979 | 6/1971 | Miller | 29/235 X |
| 3,809,365 | 5/1974 | Loffler | 215/253 X |
| 3,830,265 | 8/1974 | Matejek | 141/374 X |
| 3,900,941 | 8/1975 | Browning et al. | 29/235 X |
| 3,901,403 | 8/1975 | Menke | 215/254 X |
| 3,920,143 | 11/1975 | Vouillemin | 215/307 |

*Primary Examiner*—Horace M. Culver
*Attorney, Agent, or Firm*—Dybvig & Dybvig

[57] ABSTRACT

A molded capsule or the like serving as a secondary closure for a wine bottle or the like which may already be closed by a cork or the like is securely applied to the neck of the bottle by advancing the open end of the capsule against the already closed neck of the bottle, which may be oversized with respect to the capsule diameter, to form an initial air seal between the capsule and the bottle. Air is then injected into the capsule so as to provide an air column within the capsule which supports the capsule walls against collapse and lubricates the advance of the capsule longitudinally onto the neck of the bottle. Apparatus for accomplishing this assembly method includes means for injecting air into the capsule when initially placed against the neck of the bottle while simultaneously sealing the capsule against an excessive escape of injected air from the capsule, pressure relief means being provided to controllably release air from the capsule as the volume in which the aforementioned air column can reside is reduced by advancement of the capsule onto the neck of the bottle.

13 Claims, 8 Drawing Figures

SECONDARY CLOSURE, METHOD AND APPARATUS

BACKGROUND OF THE INVENTION

1. Field of the Invention

The present invention relates to secondary closures for food containers, such as bottles and the like, and more particularly to improved method and apparatus for applying the secondary closures to the containers and to an improved closure or capsule construction.

2. Prior Art

U.S. Pat. No. 3,920,143 illustrates a secondary closure such as utilized in the prior art, the closure having an interior lining which reduces friction between the capsule and the bottle for purposes of assembly. The patent also discloses an aperture extending through the top of the capsule for releasing air displaced from the capsule as the capsule is pressed onto an already closed bottle. Other secondary closures have been observed which have one or more openings through the top of the capsule which ventilate the cork or the like enclosed by the capsule.

Difficulties encountered with secondary closures of the prior art result from excessive friction between the container wall and the skirt of the closure as the closure is pressed onto the neck of the bottle. Thus, aforementioned U.S. Pat. No. 3,920,143 teaches the desirability of a lubricating type of surface on the interior wall of the capsule. Even with such lubrication, there is a tendency for the skirt of the capsule to collapse in an undesirable fashion as the capsule is pressed onto the bottle.

An object of the present invention is to overcome the difficulties of the prior art capsules by producing a column of air under pressure within the capsule for supporting the capsule against collapse of its skirt when pressed onto the neck of a bottle and serving to some extent as an air bearing between the neck of the bottle and the skirt of the closure.

Another object of the present invention is to provide a new and improved method for assembling capsules to bottlenecks and the like.

Another object of the present invention is to provide a new and improved apparatus for assembling capsules to necks of bottles and the like.

Still another object of the present invention is to provide a new and improved secondary closure or capsule for bottles and the like.

SUMMARY OF THE INVENTION

In the present invention, a secondary closure or capsule for assembly onto the neck of a wine bottle or the like is provided with an air-impervious skirt depending from the top surface of the capsule. The top surface of the capsule is formed with a gasket surrounding one or more openings to the interior of the capsule, said gasket adapted to cooperate with assembly apparatus to confine a column of air injected into the interior of the capsule which supports the capsule skirt against collapse and serves as an air bearing between the bottleneck and the capsule skirt as the capsule is pressed onto the neck of the bottle. The apparatus for accomplishing the assembly includes means to advance the open end of the capsule against the already closed neck of the bottle as if to establish a temporary seal between the capsule and the bottle and means which pressurizes the interior of the temporarily sealed capsule to support the skirt of the capsule against collapse. The apparatus further includes pressure relief means to accommodate the displacement of air from the capsule as the capsule is pressed onto the already closed neck of the bottle.

DESCRIPTION OF THE PREFERRED EMBODIMENT

Figure 1:
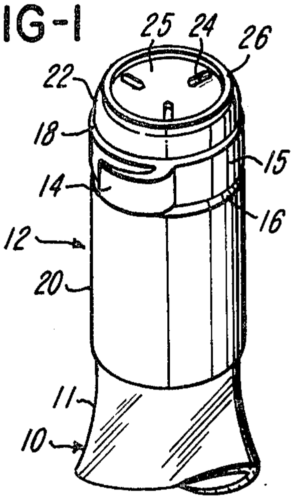
FIG. 1 is a fragmentary illustration of a bottle capped with the capsule of the present invention.

FIG. 1 illustrates a conventional wine bottle 10 covered with a capsule 12 in accordance with the present invention. The term "capsule," which may have evolved from the expression "cap seal," is employed in the present application to refer to a protective or decorative cover for the upper neck of a bottle such as a wine bottle. As known in the art, the bottle may be also sealed by a primary sealing device such as a cork, plastic stopper, screw cap, or the like, whereupon the capsule may be referred to as a secondary closure device.

The capsule 12 has a centrally disposed tear strip 15 to which is integrally attached a handle 14 for use when it is desired to open the capsule in tearing away the strip 15. To facilitate removal of the strip 15, the strip has imperforate frangible junctions 16 and 18 with other portions of the capsule 12. Thus, the junction 16 joins the tear strip 15 to a depending skirt 20. Junction 18 joins the tear strip to a cap 22.

Figure 2:
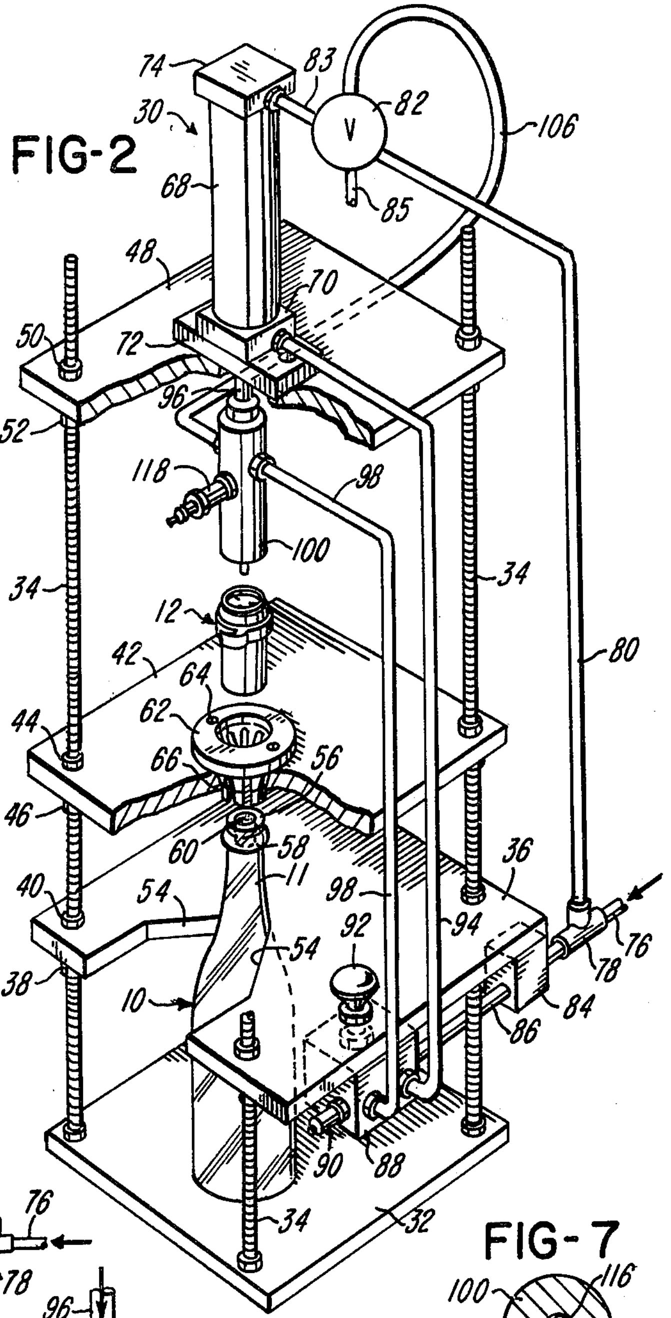
FIG. 2 is a perspective illustration with portions broken away illustrating a capping apparatus in accordance with the present invention.

The cap 22 has radially elongated perforations 24 extending through a panel 25 and surrounded by an upstanding annular rib or gasket 26. A capping apparatus for applying the capsule 12 to a bottle such as the bottle 10 is illustrated in FIG. 2, where the capping apparatus is identified by the reference number 30.

The capping apparatus is erected upon a base plate 32 utilizing upstanding threaded rods 34. The rods 34, which are four in number, collectively support a positioning or locator plate 36, whose elevation is fixed by nuts 38 and 40.

The rods 34 also support a guide plate 42, whose elevation is fixed by means of nuts 44 and 46.

Located above the guide plate 42 is a support plate 48 located by nuts 50 and 52.

The locater plate 36 has a generally V-shaped opening or window defined by convergent margins 54. The margins 54 serve to guide the neck 11 of a bottle such as the bottle 10 to a precise location on the base plate 32.

The bottle 10 can be seen to have an opening into its neck 11 defined by a lip 56 and closed by a cork 60. As is conventional, the bottle may have its lip 56 reinforced and decorated by one or more finish beads 58 which surround the neck 11. The capsule 12, which is to be applied to the bottle 10 by the capping apparatus 30, is supported for application to the bottle by a guide ring 62 mounted to the guide plate 42 by means of suitable fasteners 64. The guide ring 62 has integrally formed, downwardly depending, flexible fingers 66 for guiding the capsule 12 through a suitably sized opening 41 in the guide plate 42.

Mounted to the support plate 48 is a double-acting air cylinder 68 having an end plate 70 at one end thereof attached to a mounting plate 72 fastened to the support plate 48.

Another end plate 74 located at the top end of the air cylinder 68 is ported to receive pneumatic pressure through tubing 80 and 83 from a suitable pressure supply (not shown). The pressure supply communicates by means of tubing 76 to a T fitting 78 and through that fitting by means of tubing 80 to a three-way diaphragm valve 82.

The valve 82 is subjected always to the pressure of the pressure supply. Except as will be later described, this pressure is isolated from tubing 83 by a closed condition of diaphragm valve 82, which prevents a transmission of the supply pressure through tubing 83 to the end plate 74 and which thus prevents the transmission of an operating pressure to the air cylinder 68.

The supply pressure reaching the T fitting 78 is reduced to a regulated pressure by means of a pressure regulator 84, and the reduced or regulated pressure is transmitted through tubing 86 to a palm switch mechanism 88.

The palm switch mechanism has a speed control muffler 90 discharging to the ambient atmosphere. An operating button 92 associated with the palm switch mechanism is adapted to be engaged by the palm of an operator.

In the position illustrated in FIG. 2, the button 92 is not receiving the pressure of an operator's palm, and in this position the regulated pressure received by the switch mechanism 88 is transmitted through tubing 94 to the end plate 70 at the lower end of the air cylinder 68. This pressure operates the air cylinder 68 so as to lift upwardly an operating rod 96 projecting through the support plate 48. In the same position, adjacently located tubing 98 is connected through the muffler 90 to the ambient atmosphere.

When the operator applies a palm pressure to the button 92, the switch mechanism 88 is internally switched to shift the pressure received from the regulator 84 from the tubing 94 to the adjacently located tubing 98 and to shift the connection to the muffler 90 from tube 98 to tube 94, thus relieving the pressure to the air cylinder 68, which had held the operating rod 96 in its uppermost position. The regulated pressure being received by the switch mechanism 88 is thus applied to the pneumatic tube 98, which extends upwardly to a ram 100 affixed to the operating rod 96. The tubing 98 is a flexible tubing which can accommodate upward and downward movements of the ram 100.

Figure 3:
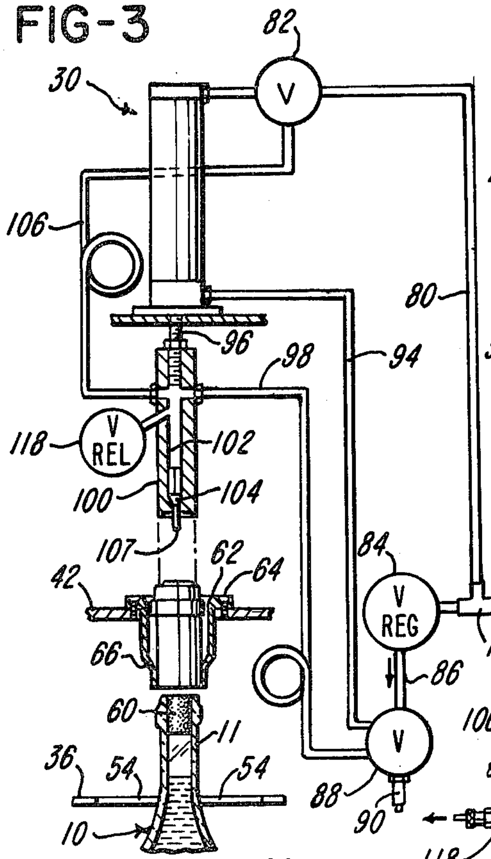
FIG. 3 is a diagrammatic section view of the capping apparatus disposed in operative association to the capsule and to a corked wine bottle.

As shown in FIG. 3, the ram 100 has a longitudinal bore or passage 102 which is exposed to the pressure available from the switch mechanism 88 through the tubing 98. The longitudinal bore 102 is closed at its upper end by threaded engagement with the operating rod 96 extending downwardly from the air cylinder 68 and is closed, except as will be hereinafter described, at its lower end by means of a check valve 104 slidably mounted for longitudinal movement in the bore 102.

The regulated pressure being received by the ram 100 under the operating conditions now being described is permitted to enter tubing 106 communicating with the bore 102. The tubing 106 is a flexible tubing which can accommodate the movement of the ram 100. The regulated pressure in the tubing 106 enters the diaphragm valve 82.

The valve 82 isolates the air pressure in the tubing 80 from the air cylinder 68 subject to the control of the pressure in the tubing 106. In basic construction, the valve 82 comprises a mechanical switch (not illustrated) operated by a diaphragm (not illustrated). The diaphragm is normally spring biased to actuate the mechanical switch to a position closing the passage to the tubing 83 and opening an exhaust port 85 by a spring return mechanism (not illustrated). Accordingly, air under pressure is not permitted to pass from the tubing 80 to the tubing 83.

Air under pressure delivered by the tubing 106, which is sometimes referred to as a pilot pressure, is thus required to be applied to the diaphragm of the valve 82 before air under the unregulated pressure residing in the tubing 80 will be permitted to pass through the tubing 83 to operate the air cylinder 68 and thereby cause the cylinder 68 to move the ram 100 downwardly. The tubing 106 is connected to the regulated pressure in the operating condition now being described. This regulated pressure is effective against the diaphragm and overcomes the spring return mechanism (not shown) to shift the diaphragm and the mechanical switch to a new position within the valve 82, in which position the connection to the tubing 83 is opened to allow actuation of the air cylinder 68 downwardly by passage of the supply pressure to the cylinder 68. In this new diaphragm position, the exhaust port 85 is closed.

As will become apparent from following remarks, it is preferred that the valve 82 have an accompanying time delay before the delivery of air from the tubing 80 to the air cylinder 68 can be interrupted and the air cylinder returned upwardly. Such delay is provided in the present invention by connecting the tubing 106 in series, by reason of the ram 100, with the tubing 98, which will be vented to the atmosphere through a delay mechanism to be described.

To be more specific, the connection by which air under pressure in the tubing 80 is delivered through the valve 82 to the air cylinder 68 cannot be broken until the pressure in the tubing 106 has dropped below a pilot pressure level approaching that of the ambient atmosphere, whereupon the aforementioned switch mechanism and associated spring means (not shown) are able to close the passage from the tubing 80 to the air cylinder 68 and simultaneously vent the tubing 83 to the exhaust port 85. The desired time delay results from the time required for the pressure in tubing 106 to be exhausted to the ambient atmosphere through the tube 94 and the muffler 90, the muffler mechanism offering a sufficient resistance to the passage of air therethrough that the transfer of air under pressure from the tubing 106 to the surrounding atmosphere is delayed.

From the foregoing description it can be appreciated that when the button 92 is not under the palm pressure of an operator, the regulated pressure available from the regulator valve 84 is passed through the tubing 94 to hold the ram 100 in an uppermost position; and when the button 92 is under palm pressure, the regulated pressure is switched to the tubing 98 as well as the tubing 106 to permit the supply pressure to be applied to the air cylinder 68 so as to drive the ram 100 downwardly.

Figure 4:
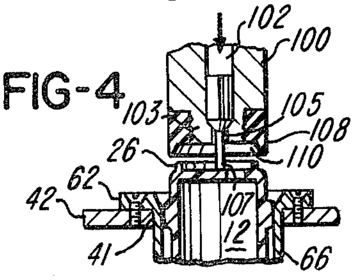
FIGS. 4, 5 and 6 are section views progressively illustrating the application of a capsule to a wine bottle in accordance with the present invention.
Figure 5:
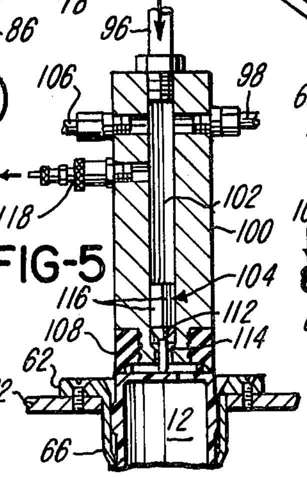
Figure 6:
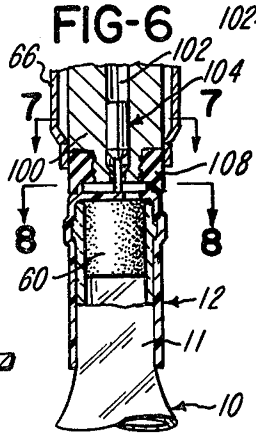

As best appears in FIGS. 4, 5 and 6, the ram 100 has a nose 103, which is of reduced diameter, projecting from its lowermost end. Passing axially through the nose 103 and coaxial with respect to the aforementioned bore 102 is an outlet passage 105, the diameter of this passage exceeding the diameter of a stem 107 projecting downwardly from the check valve 104.

Surrounding the nose 103 and suitably affixed thereto is a sleeve 108, which is preferably of a yieldable material such as hard rubber. The outside diameter of the sleeve 108 is substantially equal to the outside diameter of the ram 100, and the lower end of the sleeve 108 as it appears in FIG. 4 has a tapered inside wall 110 which defines a frustum conic section converging upwardly. As can be seen in FIG. 4, the tapered wall 110 is sized to engage the uppermost outer corners of the rib 26 standing upwardly from the capsule 12.

Referring to FIG. 5, it can be seen that the aforementioned passage 105 extending through the nose 103 connects by means of a countersink 114 to the bore 102. The countersink 114 is adapted to fit a conical wall portion 112 located at the base of the check valve 104 and attached integrally to the valve stem 107.

Figure 7:
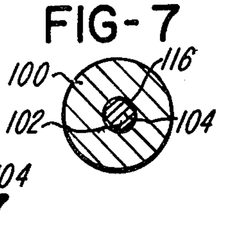
FIG. 7 is a section view taken substantially along the line 7—7 of FIG. 6.
Figure 8:
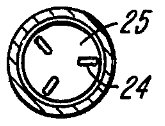
FIG. 8 is a section view taken substantially along the line 8—8 of FIG. 6.

As apparent in FIG. 7, the upper part of the check valve is of square cross section except at its corners, which may be rounded to match the curvature of the bore 102.

When the regulated air pressure is delivered to the bore 102 through the tubing 98, this air ordinarily biases the check valve 104 downwardly to seat the conical surface 112 of the check valve against the valve seat provided by the countersink 114 in the ram 100 and thereby prevent any escape of air through the passage 105 in the ram 100. It can be appreciated, however, that when the stem 107 is pushed upwardly to lift the check valve away from the countersink 114, air will escape through gaps between the flat sides 116 of the check valve and the cylindrical wall of the bore 102. The air escaping through such gaps is permitted to pass out of the ram 100 through the gap or annulus which remains between the outlet passage 105 and the valve stem 107. Thus, while the check valve 104 normally closes the lower end of the ram 100 in response to the presence of the pneumatic pressure reaching the bore 102, this closure can be interrupted by the exertion of a sufficient upward force on the valve stem 107 so that the air can escape through the lower end of the ram 100.

In operation, an operator places a bottle 10 upon the base plate 32 in a position established by the margins 54 of the locater plate 36. In this position, the mouth of the bottle is aligned coaxially with the ram 100 and with the capsule guide ring 62. The operator also places a capsule 12 concentrically within the capsule guide ring 62 at a position which allows the capsule skirt 20 to rest against the fingers 66 which project downwardly from the capsule guide ring 62.

With the bottle 10 and the capsule 12 thus positioned, the operator depresses the button 92 associated with the palm switch mechanism 88. This depression of the button 92 causes air under the pressure established by the regulator 84 to enter the tubing 106 and open the valve 82 so that supply pressure present in the tubing 80 can actuate the air cylinder 68.

This causes the ram 100 to advance downwardly to substantially the position appearing in FIG. 4, i.e., a position in which the valve stem 107 engages the panel 25 of the capsule 12.

From this point the ram 100 continues its downward motion, causing the valve stem 107 to press the capsule 12 downwardly between the fingers 66. The capsule 12 ultimately reaches a position in which the lower margin of the capsule skirt 20 contacts the lip 56 of the bottle 10, and at least at this point the downwardly moving capsule encounters sufficient resistance that the valve stem 107 lifts the valve 104 from contact with the countersink 114.

It is preferred that the inside diameter of the capsule skirt 20 be less than the outside diameter of the bottle lip 56. Thus the capsule skirt 20 is not readily stretched over the bottle lip 56.

The ram 100 nevertheless continues its downward movement, reaching substantially the position illustrated in FIG. 5. In this FIG. 5 position, the sleeve 108 is engaging the capsule rib 26. More particularly, the tapered wall 110 is bearing against the upper outside corner of the rib 26 and, both members being yieldable, cooperate to effect an air seal between the sleeve 108 and the capsule 12.

Also in this FIG. 5 position, it can be seen that the check valve 104 has been lifted off its seat formed by the countersink 114 so that air can then escape through the passage 105 to the space residing between the capsule 12 and the ram 100. The air in this space also has access to the perforations 24 located in the panel 25 of the capsule 12. This air enters the interior of the capsule 12 and fills the capsule approximately to the regulated pressure entering the ram 100.

The existence of this substantial pressure within the capsule 12 produces a tendency for the air to escape through the junction between the capsule skirt 20 and the lip 56 of the bottle 10. It should be borne in mind, however, that the ram 100 is continuing its downward movement and any tendency for air to leak through the junction between the capsule skirt 20 and the bottle 10 is quickly overcome by the resistance of the capsule skirt as it stretches about the neck of the bottle 10. To the extent any air does escape through this junction, this condition merely provides an air bearing which facilitates a movement of the capsule skirt downwardly onto the neck of the bottle.

With continued downward movement of the ram 100, the lower margin of the capsule skirt 20 encounters the finish bead 58 surrounding the neck of the bottle 10. While this bead poses a substantial obstacle for the movement of the capsule 12 onto the bottle 10, the presence of a substantial air pressure within the capsule 12, now strongly confined by the seal established between the capsule rib 26 and the ram sleeve 108, bolsters the capsule skirt 20 so that it will not collapse and leaves the capsule with no reasonable alternatives but to expand about the finish bead 58 and to continue its downward movement.

It should be noted, of course, that the cork 60 is sealing the bottle 10 and the continued downward movement of the capsule 12 requires a displacement of air from within the capsule 12. While this displacement of air might ordinarily be accommodated by a backflow from the ram 100 to the tubing 98, it is preferred as a safety precaution to protect the cork from an excessive pressure within the capsule 12 that might cause the cork to move into the bottle. Therefore, the ram 100 is provided with a relief valve 118 communicating with the bore 102 in the ram 100. The relief valve 118 is preset to whatever pressure level above the regulated pressure from the regulator 84 is required to permit the air residing in the capsule 12 to be vented as the space remaining within the capsule shrinks. The relief valve 118 may not be needed for apparatus used to place capsules over bottles closed by screw caps, T-corks or other primary closures which can withstand greater external pressures than the standard cork illustrated in the drawing.

The preferred material for the capsule 12 and especially the skirt 20 is a low density polyethylene resin with good elastic properties and stress crack resistance. Other plastic materials having a good resistance to stress cracking and an adequate flexibility may also be used. It will be appreciated by those skilled in the art that the capsule stiffening and the air bearing effects resulting from the charging of air under pressure to the interior of the capsule enables the utilization of capsules having a wall thickness smaller than has heretofore been required to accomplish the stretching of the capsule over the finishing of the bottle and to provide an adequate retention of the capsule after it has been applied to the bottle.

FIG. 6 illustrates the capsule after full application to the bottle 10, the sleeve 108 now being arrested by a bottoming of the capsule panel 25 against the bottle lip 56.

For returning the ram 100 upwardly so that the bottle 10 can be removed from the capping apparatus, the operator releases palm pressure then being applied to the button 92, whereupon the button 92 is elevated by the internal pressures of the switch mechanism 88. Upon such elevation of the palm button 92, the regulated pressure from the regulator 84 is transferred by the switch mechanism associated with the valve 82 to the tubing 94, and simultaneously the tubing 98 is connected to the ambient atmosphere through the muffler 90.

This switching action connects the diaphragm of valve 82 to the muffler 90 through the tubing 106 and the tubing 98.

The connection of the valve 82 to the ambient atmosphere through the tubing 106 permits the spring included in the valve 82 to return the diaphragm and its associated mechanical switch to block passage of the supply pressure to the end plate 74 associated with the air cylinder 68. At the same time, the shifting of the diaphragm-controlled mechanical switch connects the tubing 83 and thus the end plate 74 to the ambient atmosphere through the exhaust port 85 in valve 82. Such connection enables the air cylinder to be raised upwardly by means of the regulated pressure now presented to the tubing 94, the air displaced from the air cylinder 68 by the upward movement of the ram 100 being discharged to the ambient atmosphere through the exhaust port 85 in valve 82.

It has been found that, upon application of the capsule 12 to a bottle such as the bottle 10, air may flow downwardly between the inside surface of the capsule and the external surface of the bottle, even after the capsule has been applied fully to the bottle. This downward flow of air can function as an air bearing with the result that, if the ram 100 is lifted too quickly, air under pressure residing between the cork 60 and the panel 25 may push the capsule 12 upwardly on the neck of the bottle as the ram 100 is lifted upwardly.

In order to eliminate this behavior, the residual air pressure in the tubing 98 and 106, and also bore 102 and passage 105 of the ram 100, is controllably dissipated through the speed control muffler 90 of switch mechanism 88. Any air under pressure residing between the cork 60 and the panel 25 is likewise dissipated via the perforations 24 in the panel 25 until the pressure in tubing 106 drops to a level where the return spring in valve 82 can overcome the diaphragm and allow valve 82 to switch. This allows the pressure under the capsule panel 25 to drop sufficiently so that when the ram 100 is later driven upwardly as a result of the switching function accomplished by the valve 82, there will be no appreciable tendency for the capsule 12 to follow the ram 100 upwardly.

It is found that a three-way, normally closed, diaphragm-type valve produced by Mosier Industries, Inc., of Brookville, Ohio, and identified as Tiny Tim Valve No. 3C5D, is suitable for valve 82 described in this application. Those skilled in the art will appreciate, however, that various electronic control and timing devices, as well as other pneumatic valve mechanisms, can be employed.

The radially elongated perforations 24 located in the panel 25 at the top of the capsule 12 are found beneficial to the present invention in that they increase the freedom with which air can enter and leave the interior of the capsule 12 without unduly weakening the connection between the capsule skirt 20 and the panel 25. It is important that the perforations 24 are relatively thin in the circumferential direction so that the panel 25 will not tear between adjacent perforations as the skirt 20 is stretched over the neck of the bottle 10.

While the present invention has been illustrated and described in reference to the capping of a single bottle, it is to be appreciated that a plurality of adjacently positioned capping devices such as illustrated may be employed with either individual or common air supplies to rapidly cap the entire output of bottle-filling machinery residing in the plant.

For purposes of describing a preferred mode, the present invention has been described in reference to the use of air under pressure for operating the air cylinder 68 and associated components. It should be understood, however, that other fluid pressure media, whether liquid or gaseous, may be utilized in the practice of the present invention.

Although the present invention has been described with reference to capsules for application to bottles such as wine bottles, it should be appreciated that the capsule 12 described in this application is essentially an elongate sleeve member with open ends, the top end being open by reason of the radially disposed perforations 24. It should thus be understood that the method and apparatus of the present invention is applicable to elongate sleeve members of diverse forms which may be engaged by a ram or the like, such as the ram 100 described in this application, and such sleeve members may be stretched about diverse forms of neck members, not necessarily bottlenecks such as disclosed in the present invention.

Although the preferred embodiments of this invention have been described, it will be understood that various changes may be made within the scope of the appended claims.

Having thus described my invention, I claim:

1. Apparatus for applying a capsule onto a bottle neck, said capsule being of the type comprising a sleeve member having opposite end portions and perforate panel means traversing one of said end portions, said apparatus including a ram having an opening to said panel means, said ram having means for sealingly engaging said capsule at said one of said end portions in surrounding relation to said opening, means for supporting said capsule between said ram and said neck, means for relatively moving said ram and said neck to respectively engage said capsule at said opposite end portions, means for injecting a fluid under pressure through said opening and said panel means into said capsule for supporting the same against collapse upon relative movement of said ram and said neck, said means for injecting a fluid under pressure including check valve means biased by the fluid under pressure to a position wherein the fluid under pressure is prevented from exiting from said opening, said check valve means including means engaging said capsule at said one of said end portions for displacing said check valve means so that fluid under pressure exits from said opening during at least part of the relative movement of said ram and said neck toward one another.

2. The apparatus of claim 1 wherein said means for injecting a fluid under pressure includes means for transmitting fluid from a supply of fluid into said ram, said ram having a longitudinal bore communicating with said opening for the receipt of said fluid, and said check valve means is slidably movable in said bore.

3. The apparatus of claim 2 including relief valve means for relieving the pressure of said fluid in said bore to prevent an excessive buildup of pressure that may be caused when said panel means approaches said neck.

4. The apparatus of claim 2 wherein said means engaging said panel means comprises a stem extending outwardly of said ram.

5. The apparatus of claim 1 wherein said capsule has a rib standing upwardly from said panel means and surrounding a perforation through said panel means and wherein said means for sealingly engaging said capsule comprises a frustrum conic end portion of said ram adapted to sealingly engage said rib.

6. The apparatus of claim 5 wherein said frustum conic end portion comprises a rubber material.

7. Apparatus for applying a sleeve member having opposite end portions onto a neck portion, said apparatus including a ram having an opening therethrough, said ram having means for sealingly engaging one end portion of said sleeve member in surrounding relation to said opening, means for relatively moving said ram and said neck portion to respectively engage said one end and said other end portions, means for reversing said means for relatively moving, means for injecting a fluid under pressure through said opening into said sleeve member for supporting the same against collapse upon relative movement of said ram and said neck portion, and means responsive to said means for reversing for relieving the pressure of fluid remaining in said sleeve member prior to reversal of the relative movement of said ram and said neck portion.

8. The apparatus of claim 7 for use with a sleeve member comprising a capsule having perforate panel means at one end wherein said means for injecting a fluid includes check valve means biased by the fluid under pressure to a position wherein the fluid under pressure is prevented from exiting from said opening, said check valve means including means engaging said panel means for displacing said check valve means so that fluid under pressure exits from said opening during at least part of the relative movement of said ram and said neck portion toward one another.

9. The apparatus of claim 8 including relief valve means for relieving the pressure of said fluid to prevent an excessive buildup of pressure that may be caused when said panel means approaches said neck portion.

10. Apparatus for applying a capsule onto a bottle neck, said capsule being of the type comprising a sleeve member having opposite end portions and perforate panel means traversing one of said end portions, said apparatus including a ram having an opening to said panel means, said ram having means for sealingly engaging said capsule at said one of said end portions in surrounding relation to said opening, means for supporting said capsule between said ram and said neck, means for relatively moving said ram and said neck to respectively engage said capsule at said opposite end portions, means for injecting a fluid under pressure through said opening and said panel means into said capsule for supporting the same against collapse upon relative movement of said ram and said neck, said means for injecting including relief valve means for preventing the builup of excessive pressure in the area between said neck and said panel as said panel approaches said neck.

11. The apparatus of claim 10 wherein said capsule has a rib standing upwardly from said panel means and surrounding a perforation through said panel means and wherein said means for sealingly engaging said capsule comprises a frustum conic end portion of said ram adapted to sealingly engage said rib.

12. The apparatus of claim 11 wherein said frustum conic end portion comprises a rubber material.

13. Apparatus for applying a capsule onto a bottle neck, said capsule being of the type comprising a sleeve member having opposite end portions and perforate panel means traversing one of said end portions, said apparatus including a ram having an opening to said panel means, said ram having means for sealingly engaging said capsule at said one of said end portions in surrounding relation to said opening, means for supporting said capsule between said ram and said neck, means for relatively moving said ram and said neck to respectively engage said capsule at said opposite end portions, and means for injecting a fluid under pressure through said opening and said panel means into said capsule for supporting the same against collapse upon relative movement of said ram and said neck.

* * * * *